US012803146B2

(12) United States Patent
Thompson et al.

(10) Patent No.: US 12,803,146 B2
(45) Date of Patent: Nov. 17, 2026

(54) MULTI-CHANNEL ISOLATION TRANSFORMER AND GATE DRIVER STRUCTURES

(71) Applicant: Allegro MicroSystems, LLC, Manchester, NH (US)

(72) Inventors: Andrew Thompson, Northwich (GB); Manoj Balakrishnan, Ingleby Barwick (GB); Joseph Duigan, Peymeinade (FR); Andrew Bernard Keogh, Cork (IE); Tue T. Vu, Dublin (IE)

(73) Assignee: Allegro MicroSystems, LLC, Manchester, NH (US)

( * ) Notice: Subject to any disclaimer, the term of this patent is extended or adjusted under 35 U.S.C. 154(b) by 64 days.

(21) Appl. No.: 18/933,036

(22) Filed: Oct. 31, 2024

(65) Prior Publication Data

US 2026/0121272 A1 Apr. 30, 2026

(51) Int. Cl.
*H01P 1/36* (2006.01)

(52) U.S. Cl.
CPC .................................... *H01P 1/36* (2013.01)

(58) Field of Classification Search
CPC ...... H01F 1/147; H01F 27/24; H01F 27/2823; H01F 41/005; H01F 27/2804
See application file for complete search history.

(56) References Cited

U.S. PATENT DOCUMENTS 3,694,726 A * 9/1972 Cielo .................. H02M 3/3378 363/25
4,461,966 A 7/1984 Hebenstreit
4,748,351 A 5/1988 Barzegar
4,902,942 A * 2/1990 El-Hamamsy .......... H01F 29/14 315/276
4,970,420 A 11/1990 Billings
5,019,719 A 5/1991 King
5,051,609 A 9/1991 Smith
5,430,613 A 7/1995 Hastings et al.
5,598,135 A 1/1997 Maeda et al.
(Continued)

FOREIGN PATENT DOCUMENTS

CH 676763 A5 * 2/1991 ............. H01F 38/08
DE 3700488 A1 7/1988
(Continued)

OTHER PUBLICATIONS

U.S. Appl. No. 18/192,932, filed Mar. 30, 2023, Horan et al.
(Continued)

*Primary Examiner* — Quan Tra
(74) *Attorney, Agent, or Firm* — DALY, CROWLEY, MOFFORD & DURKEE, LLP

(57) ABSTRACT

Systems, structures, packages, circuits, and methods provide multi-channel isolation transformer and gate driver structures with one or more primary and multiple secondary coils. The transformer structures include magnetic cores configured for use with multiple channels providing galvanic isolation for each channel. The channels can pass control (data) and/or power signals/pulses. One or more integrated circuits may be included with transformer packages, structures, and modules. In some examples, structure, chip packages, or modules may include one or more galvanically isolated gate drivers and/or other high voltage circuits.

34 Claims, 8 Drawing Sheets

(56) References Cited

U.S. PATENT DOCUMENTS

| | | | |
|---|---|---|---|
| 5,847,631 A | 12/1998 | Taylor et al. | |
| 5,959,846 A | 9/1999 | Noguchi et al. | |
| 6,107,860 A | 8/2000 | Vinciarelli | |
| 6,181,130 B1 | 1/2001 | Hoshi et al. | |
| 6,281,560 B1 | 8/2001 | Allen et al. | |
| 6,344,768 B1 * | 2/2002 | Daun-Lindberg | H02M 3/33573 327/108 |
| 6,377,155 B1 | 4/2002 | Allen et al. | |
| 6,775,901 B1 | 8/2004 | Lee et al. | |
| 6,791,851 B2 | 9/2004 | Brkovic | |
| 7,023,315 B2 | 4/2006 | Yeo et al. | |
| 7,119,448 B1 | 10/2006 | de Stasi | |
| 7,173,835 B1 | 2/2007 | Yang | |
| 7,663,351 B2 | 2/2010 | Korsunsky | |
| 7,719,112 B2 | 5/2010 | Shen | |
| 7,804,697 B2 | 9/2010 | Melanson | |
| 7,868,431 B2 | 1/2011 | Feng et al. | |
| 8,063,689 B2 | 11/2011 | Theiler | |
| 8,094,458 B2 | 1/2012 | Furnival | |
| 8,217,748 B2 | 7/2012 | Feng et al. | |
| 8,680,837 B2 | 3/2014 | Zeng et al. | |
| 8,736,343 B2 | 5/2014 | Chen et al. | |
| 8,816,666 B2 | 8/2014 | Kimura et al. | |
| 8,884,657 B2 * | 11/2014 | Gan | H03K 17/691 327/108 |
| 9,048,020 B2 | 6/2015 | Calvillo Cortes et al. | |
| 9,660,584 B2 | 5/2017 | Modi et al. | |
| 9,743,523 B2 | 8/2017 | Huang et al. | |
| 9,847,166 B2 | 12/2017 | Kneller | |
| 9,887,034 B2 | 2/2018 | Francis | |
| 9,899,140 B2 | 2/2018 | Kneller et al. | |
| 9,922,764 B2 | 3/2018 | Kneller et al. | |
| 9,948,294 B2 | 4/2018 | Peter et al. | |
| 10,002,703 B2 | 6/2018 | Wang et al. | |
| 10,014,798 B1 | 7/2018 | Vinciarelli | |
| 10,062,495 B2 | 8/2018 | Lloyd | |
| 10,079,090 B2 * | 9/2018 | Teggatz | H04B 5/266 |
| 10,176,917 B2 | 1/2019 | Parish et al. | |
| 10,217,558 B2 | 2/2019 | Kneller | |
| 10,224,143 B2 | 3/2019 | Kneller et al. | |
| 10,229,779 B2 | 3/2019 | Harber | |
| 10,234,513 B2 | 3/2019 | Vig et al. | |
| 10,256,027 B2 | 4/2019 | Li et al. | |
| 10,319,509 B2 | 6/2019 | Kneller et al. | |
| 10,347,413 B2 | 7/2019 | Francis | |
| 10,573,457 B2 | 2/2020 | Wang et al. | |
| 10,811,181 B2 | 10/2020 | Parish et al. | |
| 10,930,422 B2 | 2/2021 | Francis | |
| 10,998,123 B2 * | 5/2021 | Ohba | H01F 27/2823 |
| 11,139,102 B2 | 10/2021 | Kneller et al. | |
| 11,201,619 B2 | 12/2021 | Rinne et al. | |
| 11,211,929 B2 | 12/2021 | Rinne et al. | |
| 11,282,631 B2 | 3/2022 | Francis | |
| 11,764,778 B2 | 9/2023 | Rinne et al. | |
| 12,160,232 B2 | 12/2024 | Rinne et al. | |
| 12,485,783 B2 * | 12/2025 | Yeo | B60L 53/20 |
| 2004/0239466 A1 * | 12/2004 | Rouser | H01F 27/26 336/200 |
| 2008/0048580 A1 * | 2/2008 | Hsueh | H05B 41/2827 315/278 |
| 2008/0143276 A1 * | 6/2008 | Hsueh | H05B 41/2827 336/170 |
| 2009/0147544 A1 | 6/2009 | Melanson | |
| 2009/0201115 A1 * | 8/2009 | Ghoshal | H01F 1/344 336/200 |
| 2009/0237899 A1 | 9/2009 | Furnival | |
| 2012/0008344 A1 | 1/2012 | Zeng et al. | |
| 2012/0206171 A1 | 8/2012 | Kimura et al. | |
| 2013/0293268 A1 | 11/2013 | Draxelmayr et al. | |
| 2015/0357116 A1 * | 12/2015 | Yamakawa | H01F 27/38 363/17 |
| 2016/0181004 A1 | 6/2016 | Li et al. | |
| 2018/0286577 A1 * | 10/2018 | Renteria | H01F 27/24 |
| 2020/0234869 A1 | 7/2020 | Ishibashi et al. | |
| 2020/0381176 A1 * | 12/2020 | Kolar | H02M 3/01 |
| 2021/0376822 A1 | 12/2021 | Thompson et al. | |
| 2022/0224236 A1 * | 7/2022 | Elshaer | H02M 3/33553 |
| 2022/0286055 A1 * | 9/2022 | Baranwal | H02J 7/06 |
| 2022/0311433 A1 * | 9/2022 | Miatton | H03K 17/567 |
| 2023/0360851 A1 * | 11/2023 | Rooyakkers | G06F 13/364 |
| 2024/0355797 A1 | 10/2024 | Salato et al. | |
| 2025/0357889 A1 * | 11/2025 | Cai | H02S 40/32 |

FOREIGN PATENT DOCUMENTS

| | | | |
|---|---|---|---|
| DE | 10 2004 033 125 A1 | | 2/2006 |
| GB | 2 250 383 A | | 6/1992 |
| GB | 2 341 288 A | | 3/2000 |
| JP | 59124705 A | * | 7/1984 |
| JP | H01300617 A | | 12/1989 |
| JP | 2001 167941 A | | 6/2001 |
| JP | 2003 234234 A | | 8/2003 |
| JP | 2008 072021 A | | 3/2008 |
| JP | 2013062936 A | * | 4/2013 |
| WO | WO 93/21690 33 | | 10/1993 |
| WO | WO 95/12247 14 | | 5/1995 |
| WO | WO 2009/008739 A1 | | 1/2009 |
| WO | WO 2010/061281 A2 | | 6/2010 |
| WO | WO 2011/137845 A1 | | 11/2011 |
| WO | WO 2021/211920 A1 | | 10/2021 |

OTHER PUBLICATIONS

U.S. Appl. No. 18/297,034, filed Apr. 7, 2023, Torti.
U.S. Appl. No. 18/300,708, filed Apr. 14, 2023, Mangtani et al.
U.S. Appl. No. 18/300,711, filed Apr. 14, 2023, Taylor et al.
U.S. Appl. No. 18/302,998, filed Apr. 19, 2023, Salato et al.
U.S. Appl. No. 18/303,740, filed Apr. 20, 2023, Horan et al.
U.S. Appl. No. 18/307,921, filed Apr. 27, 2023, Salato et al.
U.S. Appl. No. 18/321,859, filed May 23, 2023, Horan et al.
U.S. Appl. No. 18/327,292, filed Jun. 1, 2023, Horan et al.
U.S. Appl. No. 18/338,479, filed Jun. 21, 2023, Taylor.
U.S. Appl. No. 18/340,053, filed Jun. 23, 2023, Salato et al.
U.S. Appl. No. 18/349,266, filed Jul. 10, 2023, Mangtani et al.
U.S. Appl. No. 18/350,049, filed Jul. 11, 2023, Taylor.
U.S. Appl. No. 18/456,666, filed Aug. 28, 2023, David et al.
U.S. Appl. No. 18/471,443, filed Sep. 21, 2023, Salato et al.
U.S. Appl. No. 18/477,755, filed Sep. 29, 2023, Thompson.
U.S. Appl. No. 18/495,060, filed Oct. 26, 2023, Mangtani et al.
U.S. Appl. No. 18/519,254, filed Nov. 27, 2023, Chandra et al.
U.S. Appl. No. 18/524,130, filed Nov. 30, 2023, Chandra et al.
U.S. Appl. No. 18/524,132, filed Nov. 30, 2023, Chandra et al.
U.S. Appl. No. 18/533,527, filed Dec. 8, 2023, David et al.
U.S. Appl. No. 18/537,906, filed Dec. 13, 2023, Mangtani et al.
U.S. Appl. No. 18/538,520, filed Dec. 13, 2023, Chandra et al.
U.S. Appl. No. 18/417,582, filed Jan. 19, 2024, Taylor.
U.S. Appl. No. 18/430,841, filed Feb. 2, 2024, Thompson et al.
U.S. Appl. No. 18/438,831, filed Feb. 12, 2024, David et al.
U.S. Appl. No. 18/443,469, filed Feb. 16, 2024, David et al.
U.S. Appl. No. 18/594,168, filed Mar. 4, 2024, Thompson et al.
U.S. Appl. No. 18/606,252, filed Mar. 15, 2024, Mangtani et al.
U.S. Appl. No. 18/633,685, filed Apr. 12, 2024, Balakrishnan et al.
U.S. Appl. No. 18/779,495, filed Jul. 22, 2024, David et al.
U.S. Appl. No. 18/813,518, filed Aug. 23, 2024, Mangtani et al.
U.S. Appl. No. 18/818,749, filed Aug. 29, 2024, Latham et al.
Bourgeois, "An Isolated Gate 25 Drive for Power MOSFETs and IGBTs", STMicroelectronics Group, AN461/0194, 1999; 7 pages.
"ADuM4135 Data Sheet, Single-/Dual-Supply, High Voltage Isolated IGBT Gate Driver with Miller Clamp", Analog Devices Inc., Rev. E, 2015; 17 pages.
"Si827x", Datasheet Rev. 0.5, Silicon Laboratories Inc., 2016; 43 pages.
Extended European Search Report (EESR) dated Feb. 3, 2026 for European Application No. 25196720.4; 9 Pages.

(56) References Cited

OTHER PUBLICATIONS

Response to Extended European Search Report dated Feb. 3, 2026, in connection with EP Application No. 25196720.4 as filed on Jun. 25, 2026. 6 Pages.

* cited by examiner

- Driver States:
  - Q1 ON, Q2 OFF (10)
  - Q1 OFF, Q2 ON (01)
  - Q1 OFF, Q2 OFF (00)
  - Q1 ON, Q2 ON (11)

FIG. 8A
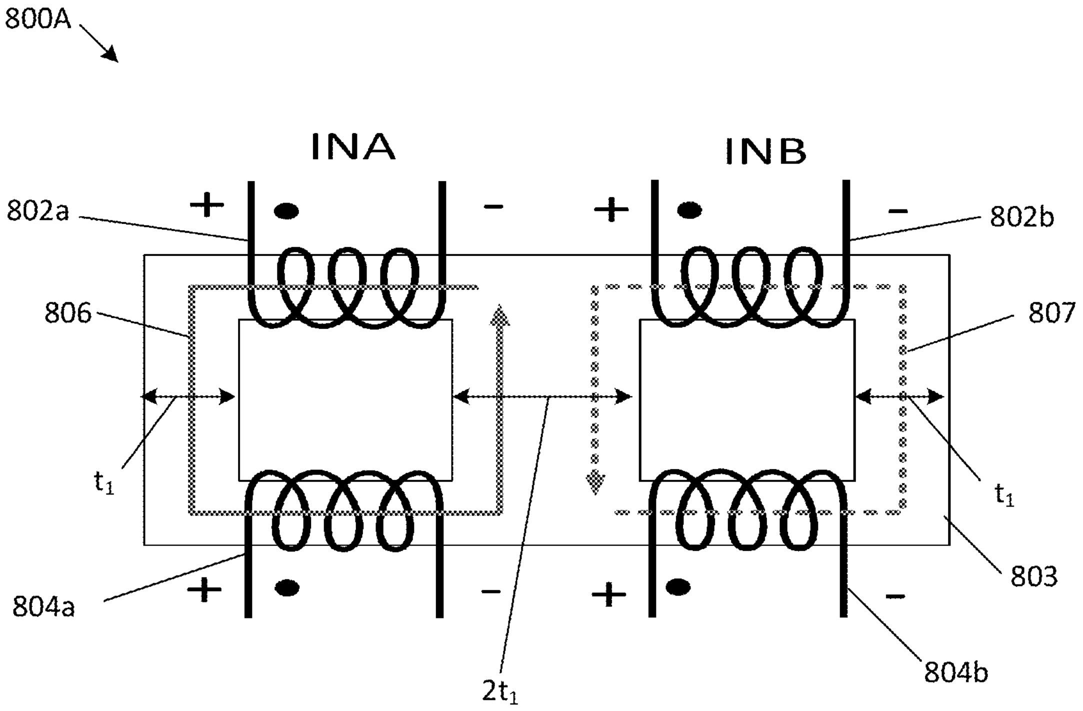
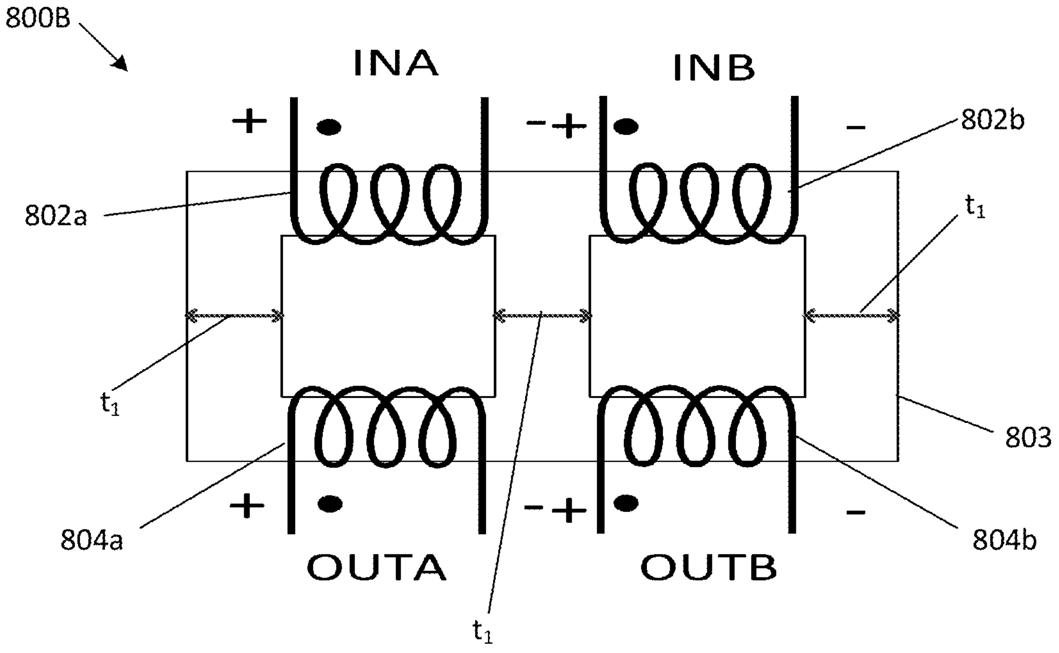
FIG. 8B

MULTI-CHANNEL ISOLATION TRANSFORMER AND GATE DRIVER STRUCTURES

BACKGROUND

Solid state switches typically include a transistor structure. The controlling electrode of the switch, usually referred to as its gate (or base), is typically controlled (driven) by a switch drive circuit, sometimes also referred to as gate drive circuit. Such solid state switches are typically voltage-controlled, turning on when the gate voltage exceeds a manufacturer-specific threshold voltage by a margin, and turning off when the gate voltage remains below the threshold voltage by a margin.

Switch drive circuits typically receive their control instructions from a controller such as a pulse-width-modulated (PWM) controller via one or more switch driver inputs. Switch drive circuits deliver their drive signals directly (or indirectly via networks of active and passive components) to the respective terminals of the switch (gate and source).

Some electronic systems, including ones with solid state switches, have employed galvanic isolation to prevent undesirable DC currents flowing from one side of an isolation barrier to the other. Such galvanic isolation can be used to separate circuits in order to protect users from coming into direct contact with hazardous voltages.

Various transmission techniques are available for signals to be sent across galvanic isolation barriers including optical, capacitive, and magnetic coupling techniques. Magnetic coupling typically relies on use of a transformer to magnetically couple circuits on the different sides of the transformer, typically referred to as the primary and secondary sides, while also providing galvanic separation of the circuits.

Transformers used for magnetic-coupling isolation barriers typically utilize a magnetic core to provide a magnetic path to channel flux created by the currents flowing in the primary and secondary sides of the transformer. Magnetic coupling isolation barriers have been shown to have various drawbacks, including manufacturing problems, for integrated circuit (IC) packages due to the included magnetic core.

SUMMARY

Aspect of the present disclosure are directed to multi-channel transformer structures, assemblies, packages, and related circuits and methods.

One general aspect of the present disclosure includes a multi-channel magnetic isolation structure. The multi-channel magnetic isolation structure can include: a magnetic core disposed on a substrate, where the magnetic core includes soft ferromagnetic material; at one or more primary coils configured about the magnetic core; a plurality of secondary coils configured about the magnetic core; one or more primary integrated circuits (ICs) corresponding connected to the one or more primary coils; and a plurality of secondary ICs connected to the plurality of secondary coils, respectively; where the structure is configured to transfer power and/or data between the one or more primary coils and the plurality of secondary coils.

Implementations may include one or more of the following features. The structure can be configured to transfer data between the plurality of secondary coils. The one or more primary coils may include a plurality of primary coils, and where the structure can be configured to transfer data between the plurality of primary coils. The plurality of secondary ICs may include one or more gate drivers configured to control a solid state switch. The solid state switch may include a field effect transistor (FET). The FET may include a power MOSFET. The one or more primary ICs may correspond in number with the one or more primary coils. The magnetic core may include first and second lateral regions and a plurality of apertures separated by at least one central region. The at least one central region may have a width about twice the width of the first lateral region and/or the second lateral region. The central region may have a width about equal to the width of the first lateral region and/or the second lateral region. The one or more primary coils may include a first primary coil that is configured about the at least one central region and may include first and second flux steering coils configured about the first and second lateral regions of the magnetic core, respectively. The one or more primary coils may include first and second primary coils configured about magnetic core on opposite sides of the at least one central region, where each of the first and second primary coils is configured to be selectively shorted. The one or more primary coils may include a complementary drive coil configured about a lateral region of the magnetic core and one or more simultaneous drive coils configured about a first central region of the magnetic core. The complementary drive coil may be configured about two lateral portions of the magnetic core. The substrate may include a printed circuit board (PCB). The PCB may include an aperture configured to receive the magnetic core. The substrate may include a lead frame.

Another general aspect includes a method of making a multi-channel magnetic isolation structure. The method can include: providing a magnetic core disposed on a substrate, where the substrate includes soft ferromagnetic material; providing one or more primary coils configured about the magnetic core; providing a plurality of secondary coils configured about the magnetic core; providing one or more primary integrated circuits (ICs) connected to the at least one primary coil; and providing a plurality of secondary ICs connected to the plurality of secondary coils, respectively; where the structure is configured to transfer power and/or data between the one or more primary coils and the plurality of secondary coils.

Implementations may include one or more of the following features. The structure (made by the method) may be configured to transfer data between the plurality of secondary coils. The one or more primary coils may include a plurality of primary coils, and where the structure may be configured to transfer data between the plurality of primary coils. The plurality of secondary ICs may include one or more gate drivers, e.g., each being configured to control a respective solid state switch. The solid state switch may include a field effect transistor (FET). The FET may include a power (switching) MOSFET. The one or more primary ICs may correspond in number with the one or more primary coils. The magnetic core may include first and second lateral regions and a plurality of apertures separated by at least one central region. The at least one central region may have a width about twice the width of the first lateral region and/or the second lateral region. The central region may have a width about equal to the width of the first lateral region and/or the second lateral region. The one or more primary coils may include a first primary coil that is configured about the at least one central region and may include first and second flux steering coils configured about the first and second lateral regions of the magnetic core, respectively. The one or more primary coils may include first and second primary coils configured about magnetic core on opposite sides of the at least one central region, where each of the first and second primary coils is configured to be selectively shorted. The one or more primary coils may include a complementary drive coil configured about a lateral region of the magnetic core and one or more simultaneous drive coils (e.g., one simultaneous drive coil) configured about a first central region of the magnetic core. The complementary drive coil may be configured about two lateral portions of the magnetic core. The substrate may include a printed circuit board (PCB). The PCB may include an aperture configured to receive the magnetic core. The substrate may include a lead frame.

The features and advantages described herein are not all-inclusive; many additional features and advantages will be apparent to one of ordinary skill in the art in view of the drawings, specification, and claims. Implementations of the described technology and/or techniques may include hardware, a method or process, or computer software on a computer-accessible medium. Moreover, it should be noted that the language used in the specification has been selected principally for readability and instructional purposes, and not to limit in any way the scope of the present disclosure, which is susceptible of many embodiments. What follows is illustrative, but not exhaustive, of the scope of the present disclosure.

BRIEF DESCRIPTION OF THE DRAWINGS

The manner and process of making and using the disclosed embodiments may be appreciated by reference to the figures of the accompanying drawings. In the figures like reference characters refer to like components, parts, elements, or steps/actions; however, similar components, parts, elements, and steps/actions may be referenced by different reference characters in different figures. It should be appreciated that the components and structures illustrated in the figures are not necessarily to scale, emphasis instead being placed upon illustrating the principals of the concepts described herein. Furthermore, embodiments are illustrated by way of example and not limitation in the figures, in which:

FIGS. 8A-8D show alternate examples of multi-channel dual-input transformer structures, in accordance with the present disclosure;

DETAILED DESCRIPTION

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The subject technology is susceptible of many embodiments. What follows is illustrative, but not exhaustive, of the scope of the subject technology.

Aspects, examples, and embodiments of the present disclosure are directed to and include transformer structures, transformer assemblies and/or packages. Such structures, assemblies, and packages can be used for systems, structures, circuits, and methods can be used for galvanic isolation (a.k.a., voltage isolation), e.g., for high-voltage applications. In some embodiments, a transformer with a core cover may have, e.g., a step up, a step down, or a power transformer configuration. In some embodiments, a transformer may have multiple input and/or output coils/coil structures providing galvanic isolation for multiple channels (e.g., multiple control signal and/or power channels).

The transformer structures, assemblies and packages (modules) may include various types of circuits (e.g., ICs); in some examples, transformer packages with ICs may include a galvanically isolated gate driver or other high voltage circuit, etc. One or more (e.g., first and second) semiconductor die having one or more integrated circuits (a.k.a., "IC die") can be included in the packages. Such integrated circuits can include, e.g., but are not limited to, high-voltage circuits such as galvanically-isolated gate drivers configured to drive an external gate on a solid-state switch, e.g., a field effect transistor (FET), a metal oxide semiconductor FET (MOSFET), a metal semiconductor FET (MESFET), a gallium nitride FET (GaN FET), a high electron mobility transistor (HEMT), a silicon carbide FET (SiC FET), an insulated gate bipolar transistor (IGBT), or another load.

Figure 1A:
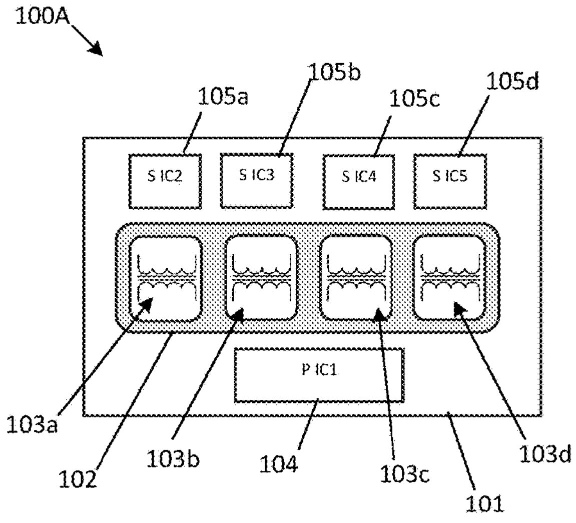
FIGS. 1A and 1B are diagrams showing example multi-channel transformer and gate driver structures providing galvanic isolation for multiple channels, in accordance with the present disclosure.
Figure 1B:
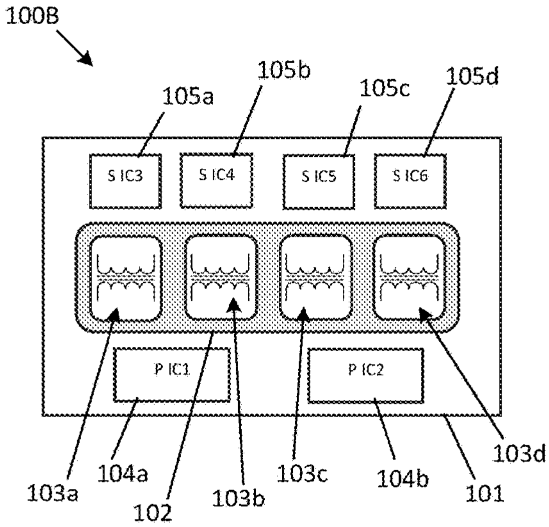

FIGS. 1A-1B are diagrams showing example multi-channel transformer and gate driver structures 100A-100B providing galvanic isolation for multiple channels, in accordance with the present disclosure.

As shown in FIG. 1A, transformer structure 100A includes a substrate supporting a magnetic core 102 having multiple sets of transformer coils 103*a-d* (four are shown) configured about respective apertures in core 102. Primary side IC 104 is connected to a primary side coil while secondary side ICs 105*a-d* are connected to secondary side coils, e.g., the four secondary coils of coil sets 103*a-d*. In some embodiments, each of secondary side ICs 105*a-d* includes a gate driver suitable for control of a semiconductor power switch, e.g., SiC FET, GaN FET, or the like.

More than one primary side IC may be present for structure 100B, as shown in FIG. 1B, which is otherwise identical to structure 100A.

Any suitable soft (magnetic property) ferromagnetic material may be used for magnetic core 102. Examples include, but are not limited to, ferrite (solid or sintered), ferrosilicon, nickel, nickel alloys (e.g., iron nickel), and/or the like. In some embodiments, magnetic cores may have shapes including closed loops of various geometries, e.g., rectangular loops, ellipsoidal loops, square loops, circular loops, etc. In some embodiments, insulative adhesive may be used between a magnetic core and the corresponding substrate portion and/or coil windings.

Any suitable material may be used for substrate 102. Examples include, but are not limited to the following: PCBs, leadframes, ceramic substrates (e.g., including low-temperature cofired ceramic, high-temperature co-fired ceramic, etc.), glass substrates, and the like. Some embodiments may omit a substrate, e.g., may use a wire-wound core mounted to another structure.

Figure 2A:
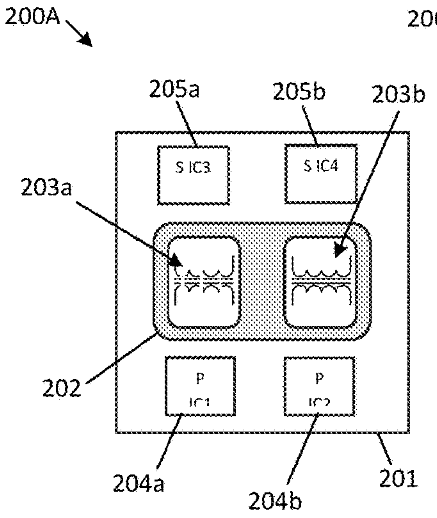
FIGS. 2A-2C are diagrams showing further example multi-channel transformer and gate driver structures, in accordance with the present disclosure.
Figure 2B:
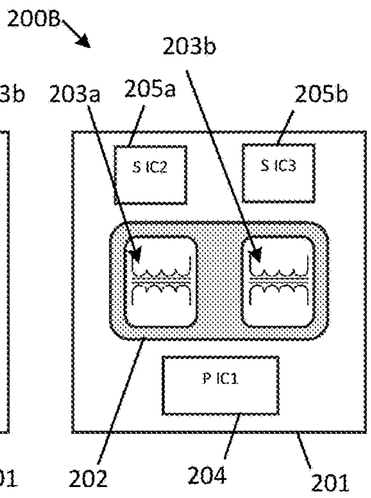
Figure 2C:
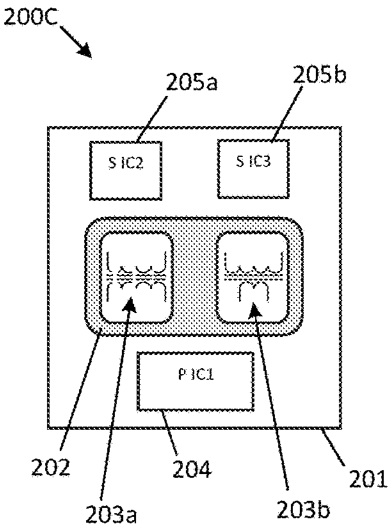

FIGS. 2A-2C are diagram showing further example multi-channel transformer and gate driver structures 200A-200C, in accordance with the present disclosure. Structures 200A-200C each include a substrate 201 and a multi-channel core 202 configured with sets of transformer coils 203*a*-203*b* with primary and secondary coils providing galvanic isolation for two channels.

As shown in FIG. 2A, structure 200A can include separate ICs for each channel. Primary side ICs 204*a*-204*b* are present, one for each channel. Similarly, secondary side ICs 205*a*-205*b* are present, one for each channel.

As shown in FIG. 2B, a single IC 204 may be used for the primary side to minimize silicon area. Similarly, in other embodiments, a single IC may be used for the secondary side.

As shown in FIG. 2C, some embodiments can include/have different windings are possible and may be implanted for different channels. For example, the first set of coil windings 203*a* is shown in a power transformer configuration while the second set of windings 203*b* is shown in a step-up configuration. Other configurations (e.g., step-down, etc.) are possible for each channel in other embodiments. In some embodiments, due to the presence of multiple windings (on the primary side and/or the secondary side of the transformer), any winding can be driven and/or configured in a way than transfers or effects transfer of data and/or power to any of the other windings.

Figure 3A:
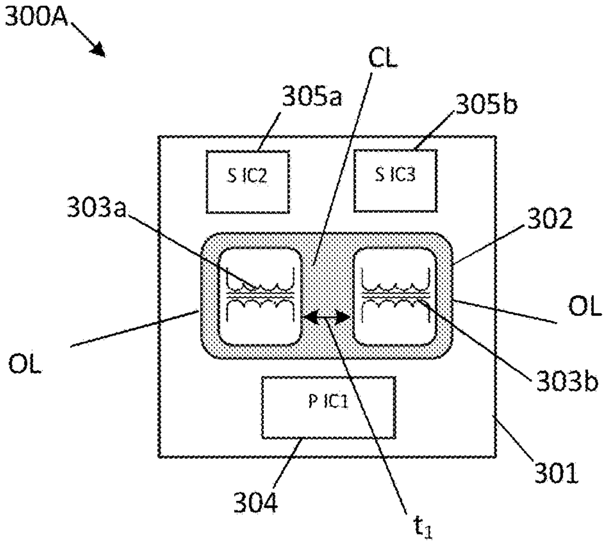
FIGS. 3A and 3B are diagrams showing further example multi-channel transformer and gate driver structures, in accordance with the present disclosure.
Figure 3B:
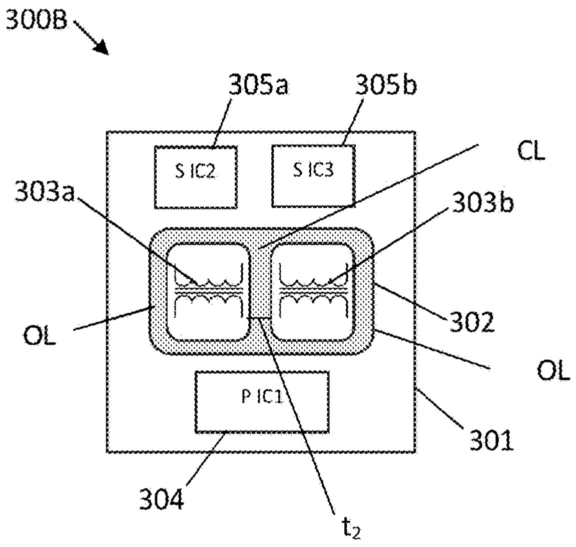

FIGS. 3A-3B are diagrams showing further example multi-channel transformer and gate driver structures 300A-300B, in accordance with the present disclosure. Structures 300A-300B each include a substrate 301 and a multi-channel core 302 configured with the channels having sets of primary and secondary coils, 303*a*-303*b*, respectively. Each structure 300*a*-300B includes a primary side IC 304 and two secondary side ICs 305*a*-305*b*, e.g., gate drivers. In some embodiments, core 302 may be or include ferrite material. Each core 302 is shown having two outer legs (OLs) and a center leg (CL).

As shown in FIG. 3A, the center leg (CL) of core (e.g., ferrite) 302 is greater than the width of each outer leg (OL) to accommodate increased flux due to contribution from both channels on either side of the center leg (CL). While the thickness ($t_1$) of the center leg (CL) is shown as being (about, exactly, or approximately) two to three times (2×-3×) the thickness of each of the outer legs (OLs), other thicknesses may of course be employed for the center leg (CL) and/or the outer legs (OLs) in other embodiments.

As shown in FIG. 3B, with timing control on the flux within the core (ferrite) 302, it is possible to make the center leg (CL) the same dimension as the outer legs (OLs) reducing footprint and simplifying the manufacturing process for the core (e.g., ferrite) 302. FIG. 3B shows the thickness ($t_2$) of the center leg (CL) as being the same as that of each of the outer legs (OLs). Other thicknesses may of course be employed for the center leg (CL) and/or the outer legs (OLs) in other embodiments.

Figure 4:
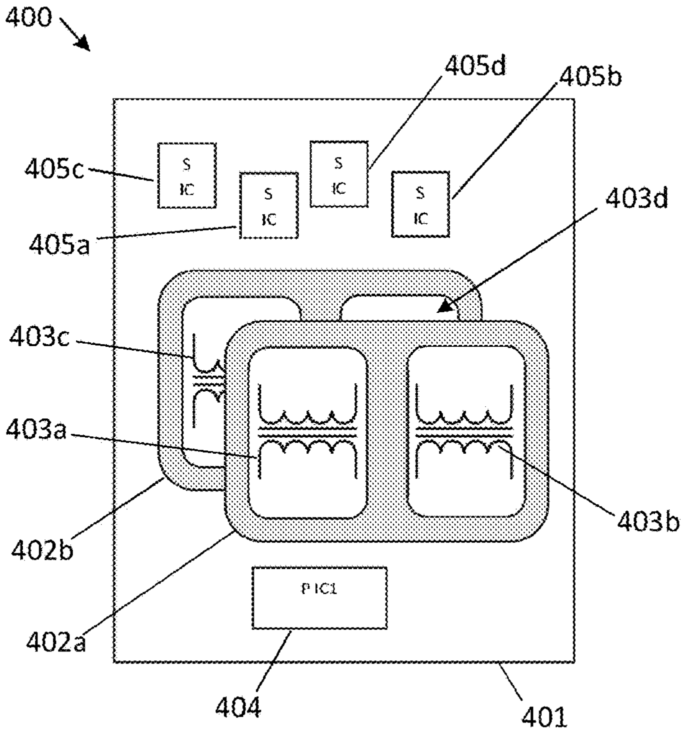
FIG. 4 is a diagram showing another example multi-channel transformer and gate driver structure, in accordance with the present disclosure.

FIG. 4 is a diagram showing another example isolation transformer and gate driver structure 400, in accordance with the present disclosure. Structure 400 includes a substrate 401 supporting (directly or indirectly) multiple, stacked magnetic cores 402*a*-402*b* (e.g., ferrite structures). Sets of transformer coils (windings) 403*a*-403*d* are shown configured about magnetic cores 402*a*-402*b*; each set of coils (windings) shown can have a primary coil and a secondary coil, in some embodiments. In other embodiments, each core 402*a*-402*b* may have one or more primary coils and one or more secondary coils. Structure 400 can include one or more primary side ICs, e.g., as shown by IC 404. Structure 400 can also include one or more secondary sides ICs, e.g., as shown by ICs 405*a*-405*d*. For example, secondary side ICs 405*a-b* may be connected to core 402*a* and ICs 405*c*-405*d* may be connected to core 402*b*. Electrical connections between ICs 404 and 405*a*-405*d* with transformer coil sets 403*a*-403*b* are omitted for visual clarity.

Of course, while transformers 402*a* and 402*b* are shown offset in the diagram, the arrangement shown is primarily for illustration purposes; in some embodiments, the transformers (e.g., 402*a*-402*b*) may be stacked without offset; or they may be entirely offset in some embodiments. More than two transformers may be utilized in some embodiments.

Figure 5A:
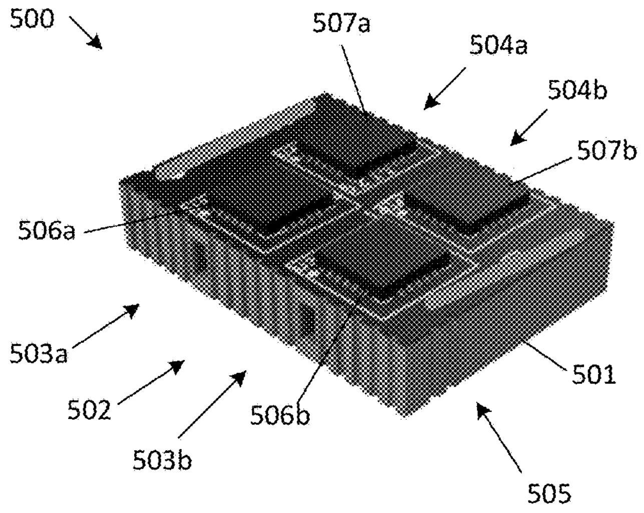
FIGS. 5A and 5B show a perspective view of an example multi-channel transformer package and a top view of an included embedded multi-channel core, in accordance with the present disclosure.
Figure 5B:
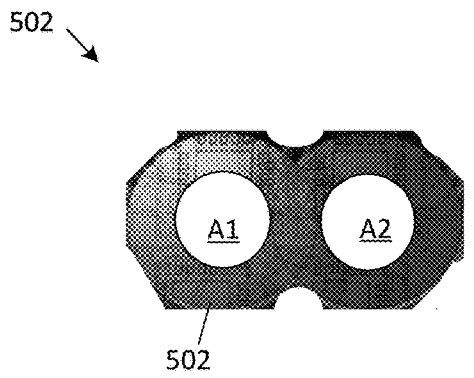

FIGS. 5A-5B show a perspective view of an example multi-channel transformer package 500 and a top view of an included embedded multi-channel core 502, in accordance with the present disclosure. Package 500 includes substrate 501, e.g., a PCB, with embedded multi-channel core 502 (not shown in FIG. 5A). Core 502 includes two apertures A1, A2, as shown in FIG. 5B, and is configured to receive primary coils 503*a*-503*b* and secondary coils 504*a*-504*b*, forming an isolation transformer 505 with two galvanically isolated channels, e.g., used for controlling two semiconductor power switches (not shown).

It will be understood that the implementation of a multi-channel transformer according to the present disclosure does not need to be substrate based. For example, some embodiments can utilize wire-wound ferrite (or other magnetic core material) for the core and coils.

Figure 6:
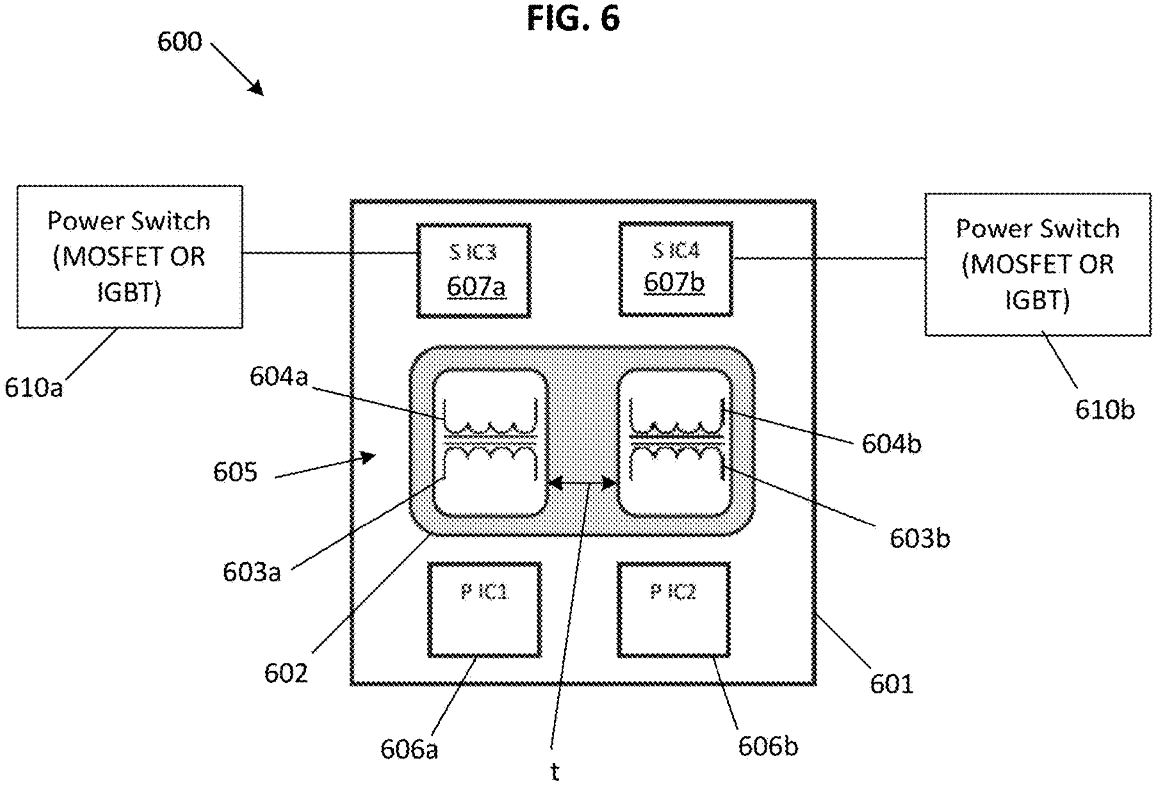
FIG. 6 is a cross-section view of an example multi-channel transformer and gate driver structure connected to a pair of semiconductor power switches, in accordance with the present disclosure.

FIG. 6 is a cross-section view of an example multi-channel transformer and gate driver structure 600 connected to a pair of semiconductor power switches, in accordance with the present disclosure. Package 600 includes substrate 601, e.g., a PCB, with multi-channel core 602. Core 602 is configured with primary coils 603*a*-603*b* and secondary coils 604*a*-604*b*, forming an isolation transformer 605 having two channels. First and second primary side ICs 606*a*-606*b* can be connected to primary coils 603*a*-603*b*, respectively. First and second secondary side ICS 607*a*-607*b*, e.g., gate drivers, can be connected to secondary coils 604*a*-604*b*, respectively.

Structure 600 is thus similar to structure 500 of FIG. 5A but also includes two semiconductor power switches 610*a*-610*b*, which can be controlled by (galvanically isolated) gate drivers 607*a*-607*b*, respectively. In some embodiments, switches 610_a_-610_b_ can be or include power IGBTs or FETs, e.g., GaN or SiC FETs, or other transistors.

Figure 7:
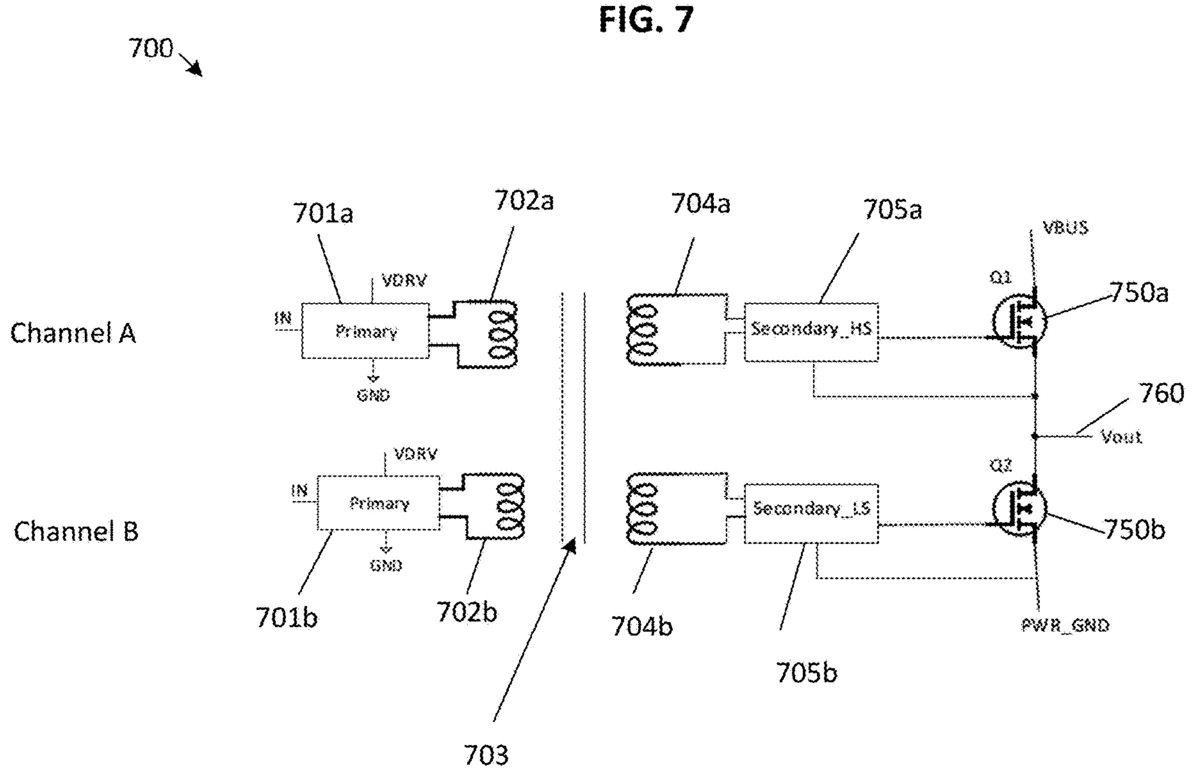
FIG. 7 is a diagram showing a further example multi-channel transformer and gate driver structure, in accordance with the present disclosure.

FIG. 7 is a diagram showing a further example multi-channel transformer and gate driver structure 700, in accordance with the present disclosure. As shown structure 700 can include/provide first and second channels (indicated as "Channel A" and "Channel B"). Different numbers of channels may be provided in other embodiments.

Structure 700 includes primary side ICs 701_a_-701_b_ and primary coils 702_a_-702_b_ for Channels 1 and Channel 2, respectively. A multi-channel magnetic core 703 is also present. In some embodiments, core 703 may have a shape similar to as shown for core 602 in FIG. 6 and include first and second apertures. Structure 700 further includes secondary side coils 704_a_-704_b_ and secondary side ICs 705_a_-705_b_ for Channels A and Channel B, respectively. In some embodiments, secondary side ICs 705_a_-705_b_ can be or include gate drivers. It will be understood that, while not expressly shown, in some embodiments one or more suitable substrates may be used for/with structure 700.

Structure 700 also includes two semiconductor power switches 750_a_-750_b_ (Q1, Q2), which can be controlled by (galvanically isolated) secondary side ICs (gate drivers) 705_a_-705_b_, respectively. In some embodiments, switches 750_a_-750_b_ can be or include power IGBTs or FETs, e.g., GaN or SiC FETs, or other transistors. In some embodiments, switches 750_a_-750_b_ can be included in or used for a power converter, e.g., used in EV applications.

As shown, structure 700 can control operation of switches 750_a_-750_b_ in multiple states: (i) Q1 ON, Q2 OFF (i.e., binary state 10); (ii) Q1 OFF, Q2 ON (i.e., binary state 01); (iii) Q1 OFF, Q2 OFF (i.e., binary state 00); and (iv) Q1 ON, Q2 ON (i.e., binary state 11).

FIGS. 8A-8D show alternate examples of multi-channel dual-input transformer structures 800A-800D, in accordance with the present disclosure. Structures 800A-800D provide galvanic isolation for two channels and includes primary coils 802_a_-802_b_, a multi-channel magnetic core 803, and secondary coils 804_a_-804_b_. The dot indicated on the transformer symbols shown indicates the phase relationship between the voltage and current in the primary and secondary windings (per the dot convention).

FIG. 8A shows an example dual-channel transformer structure that provides for transmission or control signals and power signals (pulses) across the galvanic isolation barrier provided by the transformer. Structure 800A can support non-complementary drive signals. For example, structure 800A can drive both outputs high simultaneously; or can drive both outputs low simultaneously. Structure 800A thus effectively place two single-channels side-by-side.

As shown by structure 800B in FIG. 8B, arranging the phase of the A/B channel windings can achieve center-leg flux cancellation. This configuration can allow use of the same center-leg cross-section (e.g., width or thickness, $t_1$) as the external or outer legs of core 803. Small transformer=size reduction. Some preferably includes use of two primary-side feedback–check (FB) drivers.

Figure 8C:
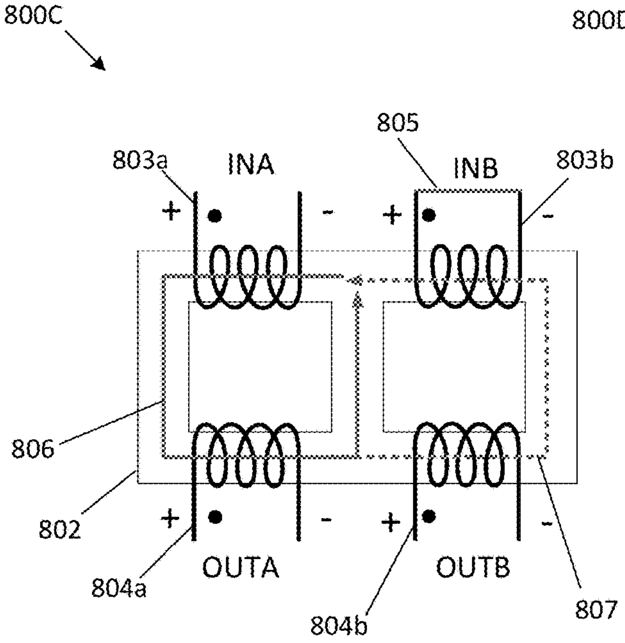
Figure 8D:
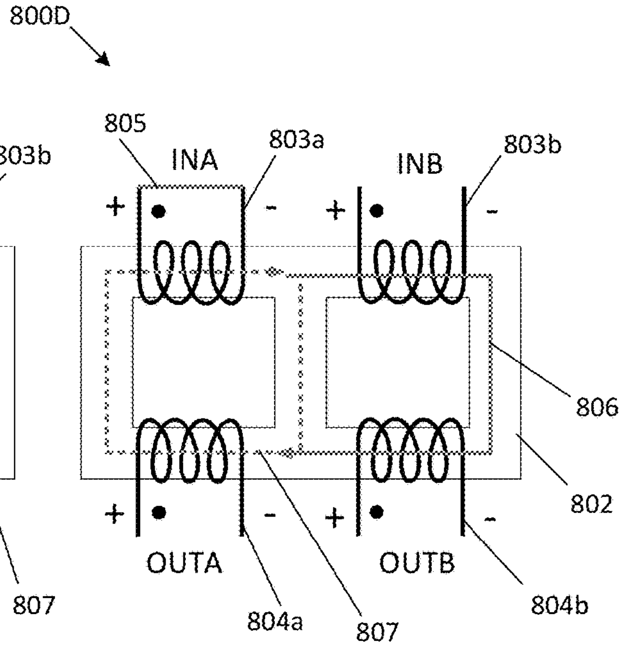

Structures 800C-800D shown in FIGS. 8C-8D are similar to structure 800B of FIG. 8B but also include clamping structures 805 to facilitate reduced flux for a selected channel.

As shown in FIG. 8C, when driving one channel only, e.g., INA, most flux flows in the core section A. In this state there is minimal flux in "off" B section, but still non-zero. This "off" section will get some induced voltage in "off" winding B. The converse applies when the other channel INB is driver (FIG. 8D). The unused INx winding can be clamped in some embodiments to reduce the risk of cross-talk between channels. It may be preferable in some embodiments for INA/B driving and clamping to be synchronized to ensure clamping at critical switching edges, but still support power-only refresh pulsing (to pass across the isolation barrier).

FIGS. 9A-9D show additional examples of multi-channel transformer structures 900A-900D with example steering, clamping, and auxiliary coil configurations, in accordance with the present disclosure. Structures 900A-900D provide galvanic isolation for two channels and include a multi-channel magnetic core 902, one or more primary coils 903, 3 and secondary coils 904_a_-904_b_ providing outputs for two channels (indicated as Channel "A" and Channel "B"). As noted previously, the dot indicated on the transformer symbols shown indicates the phase relationship between the voltage and current in the primary and secondary windings (per the dot convention).

Figure 9A:
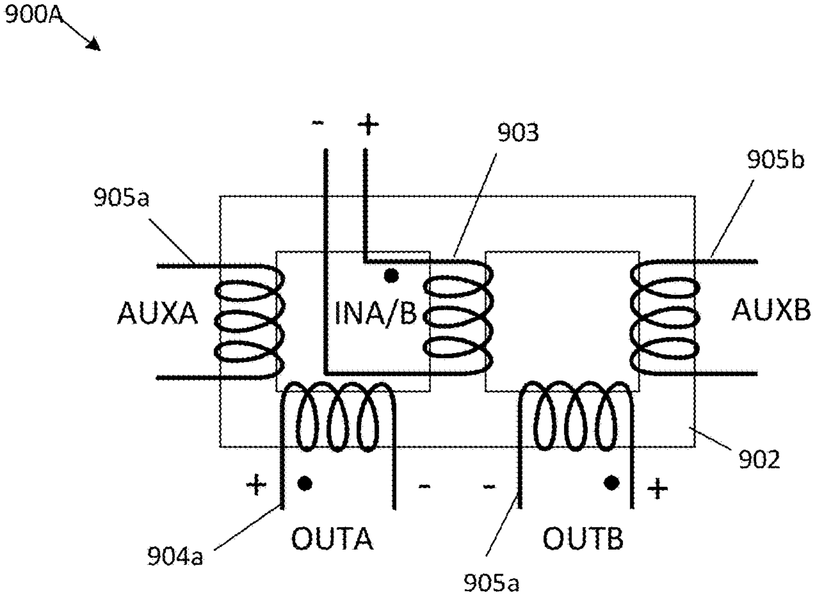
FIGS. 9A-9D show additional examples of multi-channel transformer structures with example steering, clamping, and auxiliary coil configurations, in accordance with the present disclosure.

As shown in FIG. 9A, structure 900A includes a single power primary coil (winding) 903, dual secondary coils (windings) 904_a_-904_b_, and auxiliary (AUX) "flux-steering" coils (windings) 905_a_-905_b_. The center-leg winding 903 can be used to inject input signals INA/B to structure 900A. Depending on the polarity of the INA/B signals, both outputs 905_a_-905_b_ can be drive ON simultaneously, or OFF simultaneously.

Using the independent outer-leg aux clamp windings (coils) 905_a_-905_b_, allows independent clamping of flux in either path. Thus, the configuration shown allows only a single output to be turned on, e.g., OUTA only (when AUXB is used for clamping) or OUTB only (when AUXA is used for clamping). In some embodiments, refresh power off pulses can be provided to the OFF secondary winding. Accordingly, structure 900A may also allow sending of off-refresh pulses to appropriate windings using aux steering windings 905_a_-905.

Figure 9B:
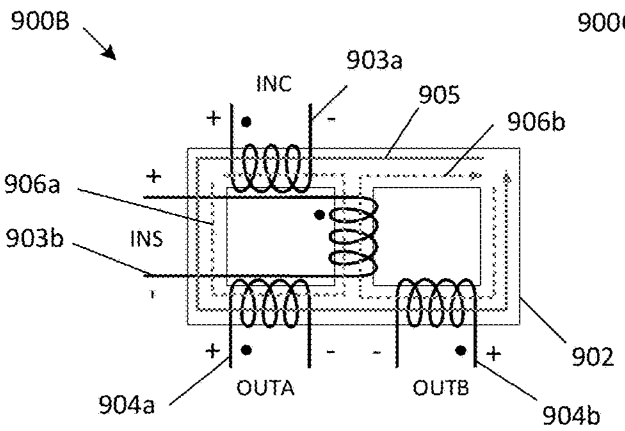
Figure 9C:
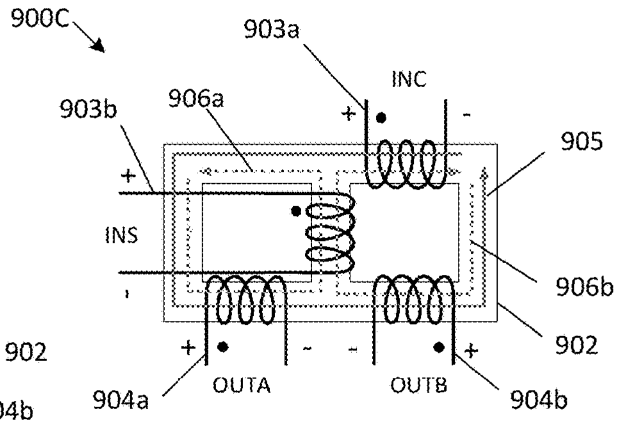

FIGS. 9B-9C show two alternative multi-channel (dual-channel), dual-input transformer structures 900B-900C with one primary power winding 903_a_ for complementary drive (INC) and a center-leg power winding 903_b_ for simultaneous drive (INS), in accordance with the present disclosure. Structures 900B-900C include first and second output windings or coils OUTA 904_a_ and OUTB 904_b_.

Winding INC 903_a_ can be used to generate the larger flux loop 905 to drive either OUTA 904_a_ high and OUTB 904_b_ low or OUTA 904_a_ low and OUTB 904_b_ high. The center-leg winding INS 903_b_ is preferably clamped while INC is energized to force/facilitate the flux to flow in the outer part of the core 902 only, as indicated by solid arrow 905. Energizing winding INS 903_b_ generates flux around each aperture (in opposed directions), as indicated by dashed arrows 906_a_-906_b_, which drives both OUTA and OUTB high/low simultaneously. It may be preferable that INC winding 903_a_ is not clamped (unclamped) while the INS winding 903_b_ is energized. Otherwise, the generated flux may tend to only flow in one output winding, which stops simultaneous drive of OUTA and OUTB.

Figure 9D:
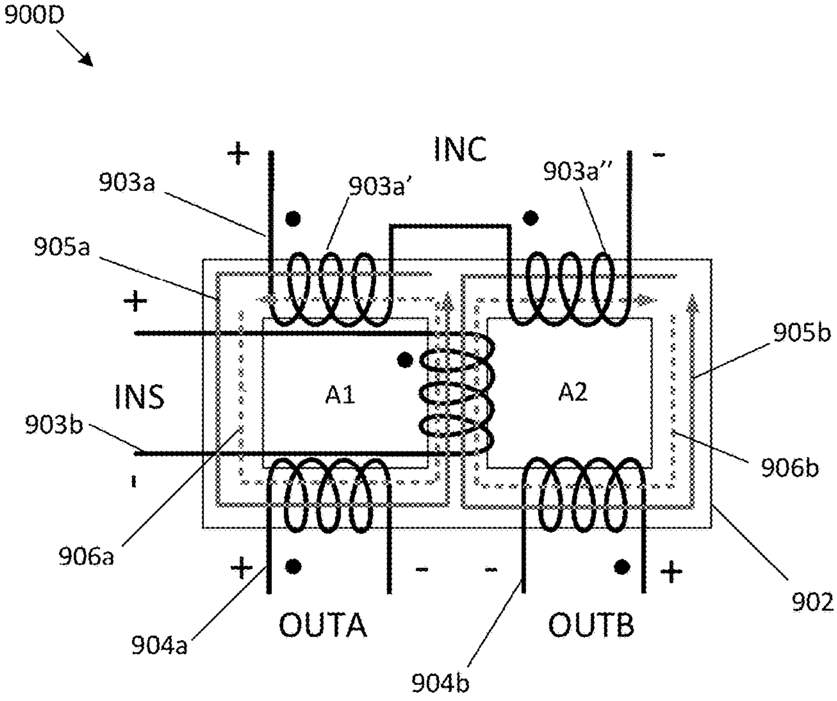

FIG. 9D shows another example multi-channel (dual-channel), dual-input 1 transformer structure 900D with a power winding or coil (INC) 903_a_ for complementary drive and a center-leg power winding or coil (INS) 903_b_ for simultaneous drive, in accordance with the present disclosure. Complementary drive winding (INC) 903_a_ includes first and second portions 903_a_' and 903_a_" configured about first and second apertures A1 and A2 (corresponding to channels A and B) in core 902, respectively. Flux generated by complementary drive winding 903*a* is indicated by solid arrows 905*a*-905*b*. Flux generated by simultaneous drive (center-leg) winding 903*b* is indicated by dashed arrows 906*a*-906*b*. Output (secondary) windings (coils) OUTA 904*a* and OUTB 904*b* are also shown.

Structure 900D is similar to structures 900B-900C but there is no need to clamp INS winding 903*b* while INC winding 903*a* is energized because the center leg of core 902 is automatically cancelled while the INC winding 903*a* is energized.

Figure 10:
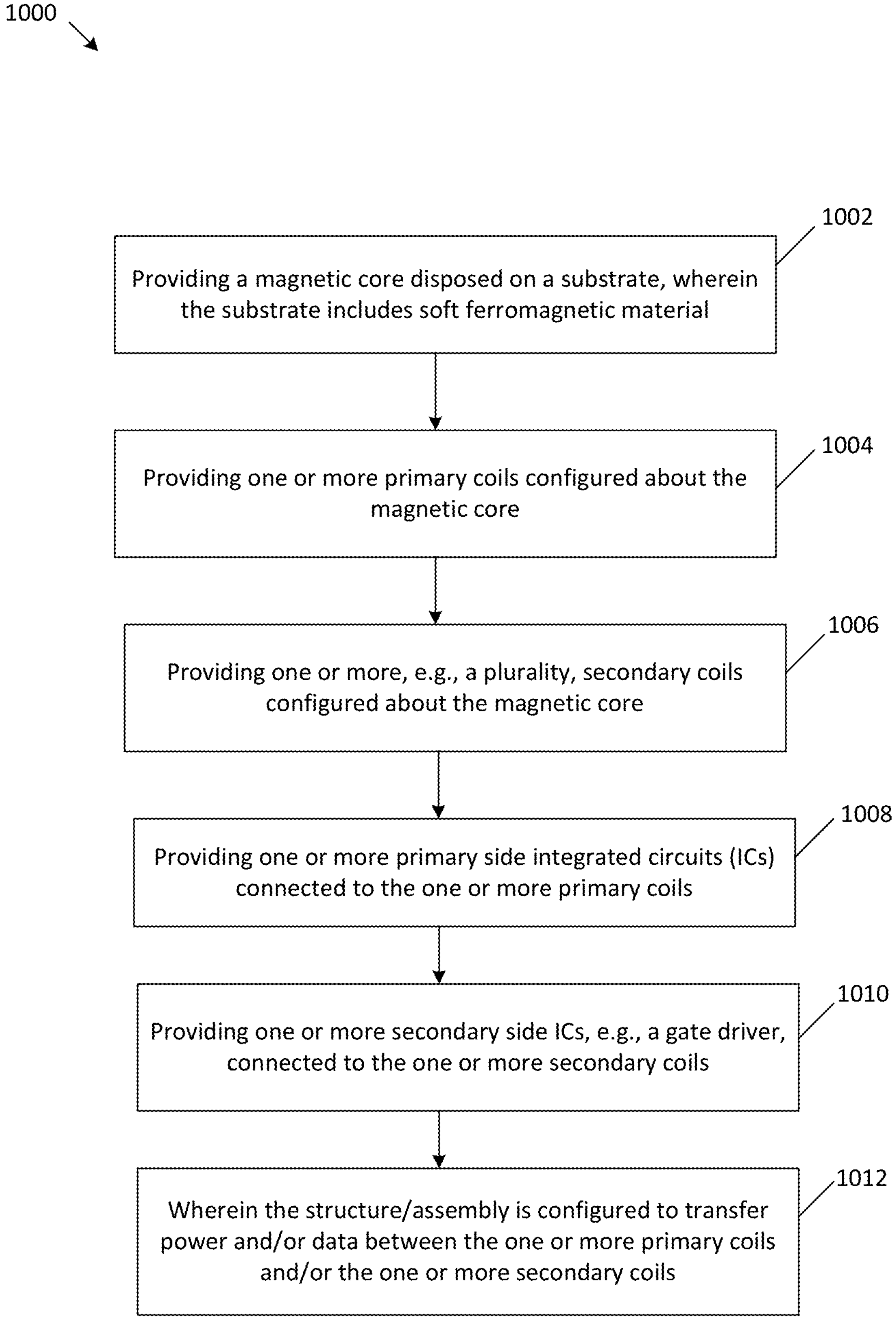
FIG. 10 is a diagram showing steps in an example method of fabricating multi-channel transformer structures, in accordance with the present disclosure.

FIG. 10 is a diagram showing steps in an example method 1000 of fabricating multi-channel transformer structures, in accordance with the present disclosure. Method 1000 can include providing a magnetic core disposed on a substrate, wherein the substrate includes soft ferromagnetic material, as described at 1002. One or more primary coils can be provided configured about the magnetic core, as described at 1004. One or more, e.g., a plurality, of secondary coils can be provided that are configured about the magnetic core, as described at 1006.

One or more primary integrated circuits (ICs) can be provided that is/are connected to the one or more primary coils, as described at 1008. One or more, e.g., a plurality, of secondary ICs can be provided that are connected to the plurality of secondary coils, as described at 1010. For example, an IC including a gate driver can be connected to each secondary coil for each separate channel, respectively. The multi-channel transformer structure(s) can be configured to transfer power and/or data between the at least one primary coil (e.g., plurality of primary coils) and/or the one or more secondary coils (e.g., plurality of secondary coils), as described at 1012. Method 1000 may include additional steps that are not shown, in some embodiments; in some embodiments, noted steps may be omitted and/or varied.

In some examples and/or embodiments, conductive features of the primary and secondary sides of a transformer structure in a transformer structure or transformer package according to the present disclosure can be fabricated or configured to have a desired separation distance (d) between certain parts or features, e.g., to meet internal creepage or external clearance requirements for a given pollution degree rating as defined by certain safety standards bodies such as the Underwriters Laboratories (UL) and the International Electrotechnical Commission (IEC). For example, a separation distance may be between closest (voltage) points of the respective circuits, e.g., the low-voltage (primary) side and high-voltage (secondary) side.

In some examples and embodiments, a dielectric material (e.g., gel) may be used for potting and/or protecting substrate (e.g., PCB) and/or transformer systems, assemblies, and/or packages, to protect die, magnetic cores, and/or interconnects from environment conditions (e.g., shocks, vibrations, or other applied forces) and/or to provide dielectric insulation.

Accordingly, embodiments and/or examples of the inventive subject matter can afford various benefits relative to prior art techniques. For example, embodiments and examples of the present disclosure can enable or facilitate multi-channel galvanic isolation for gate drivers with smaller size packages for a given power, current or voltage rating. Embodiments and examples of the present disclosure can enable or facilitate lower costs and higher scalability for manufacturing of IC packages/modules having voltage-isolated (galvanic isolation) IC die and transformers. In some embodiments, due to the presence of multiple windings (for the coil(s) on the primary side and/or secondary side of a transformer), any winding can be driven (configured) in a way than transfers or effects transfer of data and/or power to any of the other windings.

Various embodiments of the concepts, systems, devices, structures, and techniques sought to be protected are described above with reference to the related drawings. Alternative embodiments can be devised without departing from the scope of the concepts, systems, devices, structures, and techniques described. For example, in some embodiments, primary and/or secondary transformer coils may have a whole number or a fractional number of turns (loops or structures configured around a related magnetic core), e.g., 1.5, 2.5, 1.75, 1.8, 2.25, 5, 6.5, 8.8, etc.

It is noted that various connections and positional relationships (e.g., over, below, adjacent, etc.) may be used to describe elements and components in the description and drawings. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, which includes a list of elements is not necessarily limited to only those elements but can include other elements not expressly listed or inherent to such apparatus, method, composition, mixture, or article.

Additionally, the term "exemplary" means "serving as an example, instance, or illustration." Any embodiment or design described as "exemplary" is not necessarily to be construed as preferred or advantageous over other embodiments or designs. The terms "one or more" and "at least one" may be used interchangeable and indicate any integer number greater than or equal to one, i.e., one, two, three, four, etc.; those terms, however, may refer to fractional numbers/values where context admits, e.g., a number of loops in a transformer coil may be a plurality that includes a fractional value, e.g., 2.75, 3.5, 4.25, etc. The term "plurality" can refer to any integer or fractional value greater than one. The term "connection" can include an indirect connection and a direct connection.

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases do not necessarily refer to the same embodiment. Further, when a particular feature, structure, or characteristic is described in connection with an embodiment, it may affect such feature, structure, or characteristic in other embodiments whether explicitly described or not.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed but are used merely as labels to distinguish one claim element having a certain name from another element having a same name (but for use of the ordinal term) to distinguish the claim elements.

The terms "approximately" and "about" may be used to mean within ±20% of a target (or nominal) value in some embodiments, within plus or minus (±) 10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and implemented in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions as far as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

What is claimed is:

1. A multi-channel magnetic isolation structure comprising:

a magnetic core disposed on a substrate, wherein the magnetic core includes soft ferromagnetic material and wherein the magnetic core comprises first and second lateral regions and two apertures separated by a central region;

one or more primary coils configured about the magnetic core, wherein the one or more primary coils comprise a drive coil configured about the central region of the magnetic core, wherein the drive coil is configured to selectively induce two separate and distinct counter rotating flux flows in the lateral regions of the magnetic core;

a plurality of secondary coils configured about the first and second lateral regions of the magnetic core;

one or more primary integrated circuits (IC) connected to the one or more primary coils; and a plurality of secondary ICs connected to the plurality of secondary coils, respectively;

wherein the structure is configured to transfer power and data between the one or more primary coils and the plurality of secondary coils.

2. The structure of claim 1, wherein the structure is configured to transfer data between the plurality of secondary coils.

3. The structure of claim 1, wherein the one or more primary coils comprises a plurality of primary coils, and wherein the structure is configured to transfer data between the plurality of primary coils.

4. The structure of claim 1, wherein the plurality of secondary ICs comprises one or more gate drivers configured to control a solid state switch.

5. The structure of claim 4, wherein the solid state switch comprises a field effect transistor (FET).

6. The structure of claim 5, wherein the FET comprises a power MOSFET.

7. The structure of claim 1, wherein the one or more primary ICs correspond in number with the one or more primary coils.

8. The structure of claim 1, wherein the central region has a width about twice the width of the first lateral region and/or the second lateral region.

9. The structure of claim 1, wherein the central region has a width about equal to the width of the first lateral region and/or the second lateral region.

10. The structure of claim 1, further comprising first and second flux steering coils configured about the first and second lateral regions of the magnetic core, respectively, wherein the first flux steering coil is configured to selectively clamp the flux flow in the first lateral region of the magnetic core and turn off the secondary coil in the first lateral region of the magnetic core; and wherein the second flux steering coil is configured to selectively clamp the flux flow in the second lateral region of the magnetic core and turn off the secondary coil in the second lateral region of the magnetic core.

11. The structure of claim 1, wherein the one or more primary coils further comprise a complementary drive coil configured about at least one of the lateral regions of the magnetic core, wherein the complementary drive coil is configured to selectively clamp one of the flux flows and simultaneously enhance the other one of the flux flows.

12. The structure of claim 11, wherein the complementary drive coil is configured about the first and second lateral regions of the magnetic core.

13. The structure of claim 1, wherein the substrate comprises a printed circuit board (PCB).

14. The structure of claim 13, wherein the PCB includes an aperture configured to receive the magnetic core.

15. The structure of claim 1, wherein the substrate comprises a lead frame.

16. A method of making a multi-channel magnetic isolation structure, the comprising:

providing a magnetic core disposed on a substrate, wherein the substrate includes soft ferromagnetic material and wherein the magnetic core comprises first and second lateral regions and two apertures separated by a central region;

providing one or more primary coils configured about the magnetic core, wherein the one or more primary coils comprise a drive coil configured about the central region of the magnetic core, wherein the drive coil is configured to selectively induce a first flux rotating counter-clockwise in the first lateral region and a second flux rotating clockwise in the second lateral region;

providing a plurality of secondary coils configured about the first and second lateral regions of the magnetic core;

providing one or more primary integrated circuits (ICs) connected to the at least one primary coil; and providing a plurality of secondary ICs connected to the plurality of secondary coils, respectively;

wherein the structure is configured to transfer power and data between the one or more primary coils and the plurality of secondary coils.

17. The method of claim 16, wherein the structure is configured to transfer data between the plurality of secondary coils.

18. The method of claim 16, wherein the one or more primary coils comprises a plurality of primary coils, and wherein the structure is configured to transfer data between the plurality of primary coils.

19. The method of claim 16, wherein the plurality of secondary ICs comprises one or more gate drivers configured to control a solid state switch.

20. The method of claim 19, wherein the solid state switch comprises a field effect transistor (FET).

21. The method of claim 20, wherein the FET comprises a power MOSFET.

22. The method of claim 16, wherein the one or more primary ICs correspond in number with the one or more primary coils.

23. The method of claim 16, wherein the central region has a width about twice the width of the first lateral region and/or the second lateral region.

24. The method of claim 16, wherein the central region has a width about equal to the width of the first lateral region and/or the second lateral region.

25. The method of claim 16, further comprising first and second flux steering coils configured about the first and second lateral regions of the magnetic core, respectively, and wherein the first flux steering coil is configured to selectively clamp the first flux in the first lateral region of the magnetic core and the second flux steering coil is configured to selectively clamp the second flux in the second lateral region of the magnetic core.

26. The method of claim 16, wherein the one or more primary coils further comprise a complementary drive coil configured about at least one of the lateral regions of the magnetic core, wherein the complementary drive coil is configured to selectively induce a flux flow through both lateral regions, and wherein the complementary drive coil is configured to selectively drive a first output high through a first one of the plurality of secondary coils and simultaneously drive a second output low through a second one of the plurality of secondary coils.

27. The method of claim 26, wherein the complementary drive coil is configured about the first and second lateral regions of the magnetic core.

28. The method of claim 16, wherein the substrate comprises a printed circuit board (PCB).

29. The method of claim 28, wherein the PCB includes an aperture configured to receive the magnetic core.

30. The method of claim 28, wherein the substrate comprises a lead frame.

31. A multi-channel magnetic isolation structure comprising:

a magnetic core disposed on a substrate, wherein the magnetic core includes soft ferromagnetic material and wherein the magnetic core comprises first and second lateral regions and two apertures separated by a central region;

first and second primary coils configured about the magnetic core on opposite sides of the central region;

a plurality of secondary coils configured about the magnetic core on opposite sides of the central region, wherein each of the first and second primary coils is configured to be selectively shorted to selectively reduce flux flow in one of the first and second lateral regions and reduce an induced voltage in one of the secondary coils;

one or more primary integrated circuits (IC) corresponding connected to the one or more primary coils; and a plurality of secondary ICs connected to the plurality of secondary coils, respectively;

wherein the structure is configured to transfer power and/or data between the one or more primary coils and the plurality of secondary coils.

32. The structure of claim 1, further comprising first and second flux steering coils configured about the first and second lateral regions of the magnetic core, respectively, and wherein the first flux steering coil is configured to selectively enhance the flux flow in the first lateral region of the magnetic core and the second flux steering coil is configured to selectively enhance the flux flow in the second lateral region of the magnetic core.

33. The structure of claim 1, wherein the one or more primary coils further comprise a complementary drive coil configured about at least one of the lateral regions of the magnetic core, wherein the complementary drive coil is configured to selectively drive a first output high through a first one of the plurality of secondary coils and simultaneously drive a second output low through a second one of the plurality of secondary coils.

34. The method of claim 16, further comprising first and second flux steering coils configured about the first and second lateral regions of the magnetic core, respectively, and wherein the first flux steering coil is configured to selectively enhance the first flux in the first lateral region of the magnetic core and the second flux steering coil is configured to selectively enhance the second flux in the second lateral region of the magnetic core.

* * * * *